No. 646,733.  
J. C. HACKETT.  
HAME FASTENER.  
(Application filed Feb. 27, 1899.)  
(No Model.)  
Patented Apr. 3, 1900.
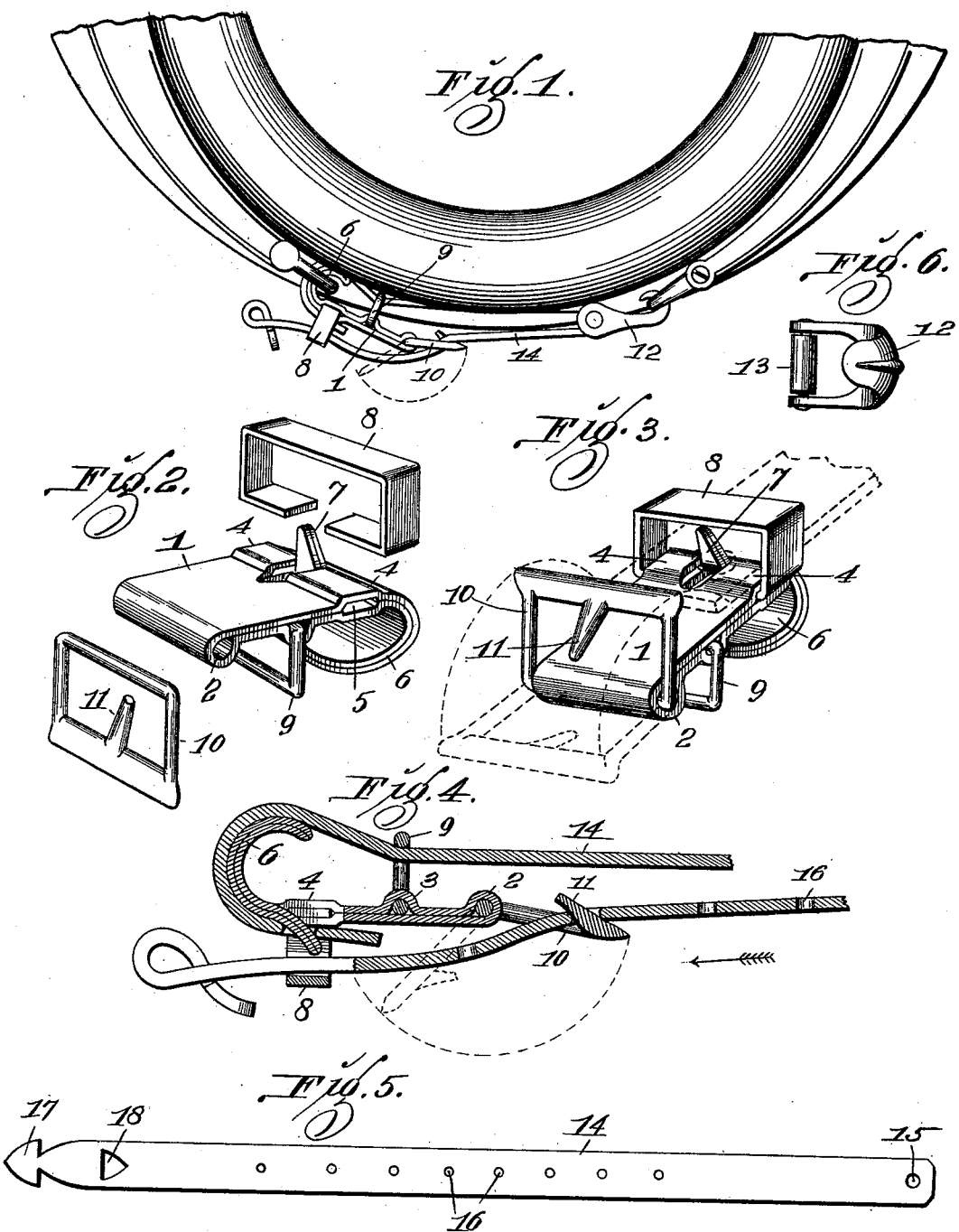
Inventor:  
John C. Hackett,  
By Higdon & Longan,  
Atty's.
Attest:  
W. P. Smith  
A. J. McCauley
THE NORRIS PETERS CO., PHOTO-LITHO., WASHINGTON, D. C.

UNITED STATES PATENT OFFICE.

JOHN C. HACKETT, OF ST. LOUIS, MISSOURI.

HAME-FASTENER.

SPECIFICATION forming part of Letters Patent No. 646,733, dated April 3, 1900.

Application filed February 27, 1899. Serial No. 707,057. (No model.)

*To all whom it may concern:*

Be it known that I, JOHN C. HACKETT, of the city of St. Louis, State of Missouri, have invented certain new and useful Improvements in Hame-Fasteners, of which the following is a full, clear, and exact description, reference being had to the accompanying drawings, forming a part hereof.

My invention relates to hame-fasteners; and it consists of the novel construction, combination, and arrangement of parts hereinafter shown, described, and claimed.

Figure 1 is a front elevation of the lower portion of a collar, showing my improved hame-fastener in position as required for use. Fig. 2 is a view in perspective of the detached portions of the buckling device made use of in my improved hame-fastener. Fig. 3 is a view in perspective of the buckling device with the parts all together. Fig. 4 is an enlarged longitudinal sectional view taken through the center of the buckling device and showing the strap passing through it. Fig. 5 is a plan view of the strap made use of in carrying out my invention. Fig. 6 is a plan view of the hook made use of in my improved hame-fastener.

The body 1 of my buckling device comprises the single length of sheet metal, in the center of which is formed the transverse loop 2, and from said loop 2 the double portions of the plate are extended laterally, there being a transverse loop 3 formed a short distance from said loop 2, and a short distance from said loop 3 are formed the oppositely-extending offsets 4, thus forming the transversely-extending rectangular aperture 5, and from said offsets the ends of the doubled plate are bent downwardly and in the form of a semicircle to form the hook 6. At a point in the centers of the oppositely-arranged offsets 4 the doubled plate is slitted or cut in the form of a V, and the material so cut out is bent upwardly to form the pin or fixed tongue 7, the same inclining slightly toward the end of the device on which is formed the loop 2.

The rectangularly-bent loop 8 of sheet metal has its ends rigidly seated in the rectangular openings 5, and before the two portions of the doubled plate are positioned together the rectangular loop 9 is arranged in the transverse loop 3, and a rectangular loop 10, provided with an inwardly and upwardly projecting fixed tongue or pin 11, is arranged in the loop 2. The loop 8 remains in a rigid or fixed position, while the loops 9 and 10 are free to move in their respective loops 3 and 2.

12 indicates a hook, the rear end of which is bifurcated, and between the portions of said bifurcated rear end is held a roller 13.

14 indicates the strap made use of in connection with the buckling device and hook hereinbefore described, which strap comprises a suitable length of leather, in one end of which is formed an aperture 15, and throughout the length of said strap are formed apertures 16. The end of said strap opposite from the end in which is formed the aperture 15 is formed into the triangular head 17, there being a triangular opening 18 formed in the strap a short distance from said triangular head 17.

When my improved device is in position to secure the ends of the hames together, the hook 6 is engaged in the loop of one of the hames, while the hook 12 is engaged in the loop of the opposite hame. The fixed pin or tongue 7 is passed through the aperture 15 in the end of the strap 14, after which said strap is passed around the hook 6, through the rectangular loop 9, and from thence to and around the roller 13, and from thence backwardly to the buckling device through the loop 10, the integral tongue or pin 11 of which is passed through one of the apertures 16 in said strap, and from thence the end of said strap is passed through the loop 8 and the triangular head 17 on the end of said strap is doubled and passed through the triangular opening 18. As this strap is doubled back of the loop 8, it will be impossible to pull the end of the strap through said loop while said end is in a doubled position, and as the thickness of the strap passing through said loop 8 fills the space from the inner face of said strap to the point of the tongue 7 it will be readily seen how the end of the strap 14 containing the aperture 15 will be held upon the tongue 7 and will be prevented from slipping from said tongue when the strap is loosened by disengaging the hook 12 from the loop on one of the hames. Thus the strap is always held in position upon the buckling device, and all parts of the fastener are practically locked together by passing the end of the strap 14 through said loop 8 and doubling it back and passing the triangular head 17 through the opening 18.

When the operator pulls upon the strap to tighten the ends of the hame together, the loop 10 swings freely, as indicated by dotted lines in Figs. 1, 3, and 4. As the free end of the strap passes through said loop and when the strap is drawn as tight as desired the loop is swung forwardly or away from the end of the buckling device 1, and the fixed tongue or pin 11 thereof is engaged in one of the apertures 16. Then when the pull upon the outer end of the strap is relieved the tension of that portion of the strap passing around the roller 13 of the hook 12 will always pull the loop 13 outwardly and away from the buckling device 1, and therefore the device cannot become unfastened until the strap is pulled in the direction indicated by the arrow in Fig. 1 a sufficient distance to disengage the pin or tongue 11 from the aperture 16, in which it has been positioned. To disengage the hame-fastener, the operator pulls the strap in the direction indicated by the arrow in Fig. 4, disengages the pin or tongue 11 from its aperture, and as the strap is now loosened the hook 12 may be removed from its loop, thus unfastening the lower ends of the hames.

A device of my improved construction possesses superior advantages in point of simplicity, durability, and general efficiency, is easily placed in position for use, can be quickly loosened, so as to disengage the lower ends of the hames, and said device is composed of a minimum number of parts, and any ordinary strap may be fitted to be used with the device.

I claim—

1. In a hame-fastener, a buckling device comprising a body portion that is composed of a section of sheet metal bent double, one end thereof being formed into a hook and there being a pair of transversely-arranged loops formed in said body portion and there being offsets in said body portion adjacent the hooked end thereof to form the transversely-extending aperture, the rectangularly-bent sheet-metal loop having its ends fixed in said aperture, a tongue cut from the material forming the body portion of the buckle, which tongue is bent upwardly beneath said fixed loop, a rectangularly-bent loop arranged to swing in the loop intermediate the ends of the body, a second rectangular loop arranged to swing in the loop formed at the end of the body opposite from the hooked end, and tongue formed integral with the outer bar of this last-mentioned loop, substantially as specified.

2. A hame-fastener, comprising a body portion that is composed of a section of sheet metal bent double, one end thereof being formed into a hook, a rectangular loop fixed to and extending from said body opposite from said hook, a pin integral with said body and extending upwardly beneath said fixed loop, a rectangular loop arranged to swing from the end of the body opposite from the hook, there being an inwardly-projecting pin formed integral with the outer bar of said loop, and a suitable strap, substantially as specified.

In testimony whereof I affix my signature in presence of two witnesses.

JOHN C. HACKETT.

Witnesses:
EDWARD E. LONGAN,
ALBERT J. MCCAULEY.